March 9, 1965  F. A. NOVOTNEY  3,172,549
TUCK-AWAY TAIL GATE
Filed Aug. 23, 1962  4 Sheets-Sheet 1
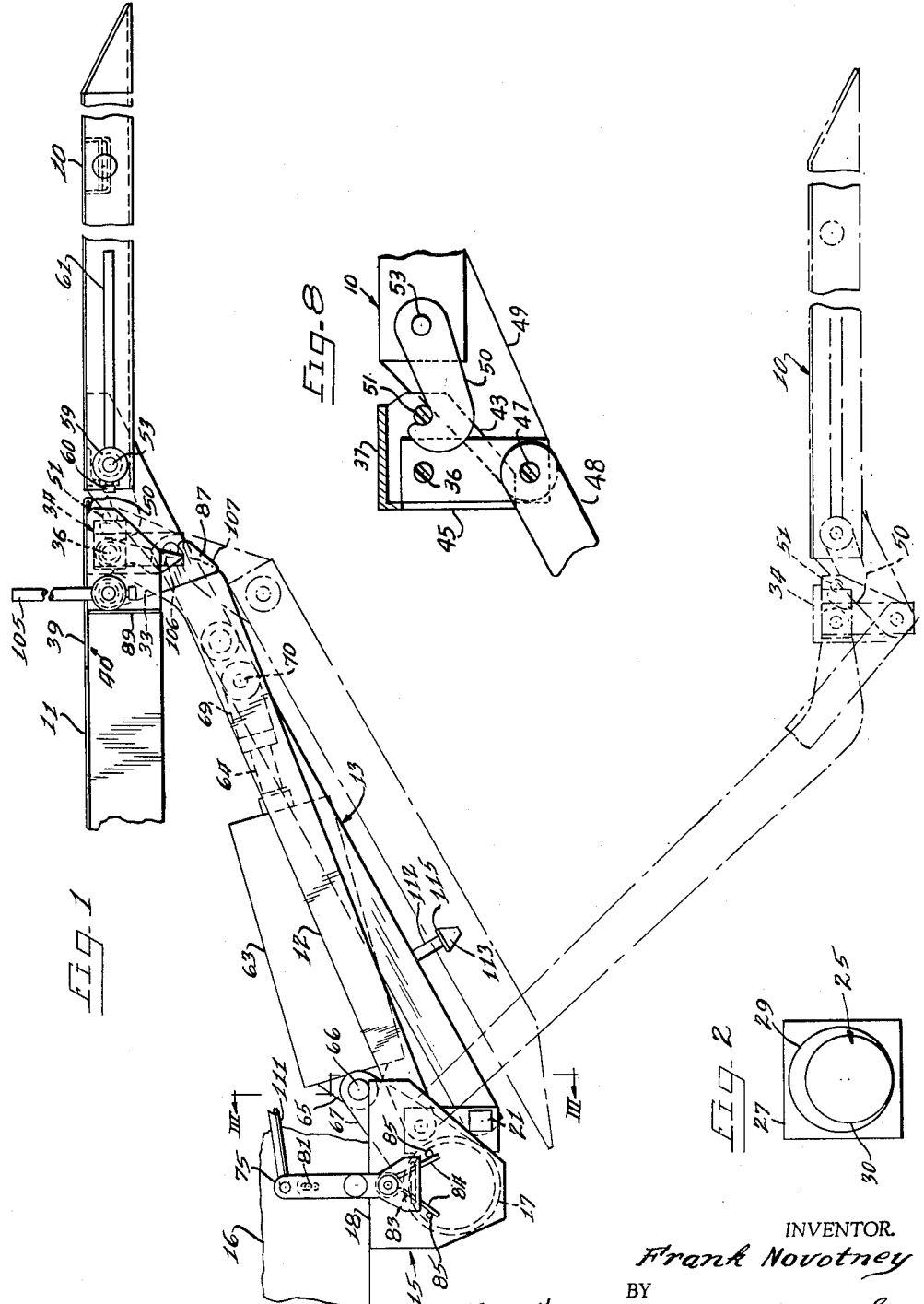
INVENTOR.
Frank Novotney
BY
ATTORNEYS March 9, 1965 F. A. NOVOTNEY 3,172,549
TUCK-AWAY TAIL GATE
Filed Aug. 23, 1962 4 Sheets-Sheet 2
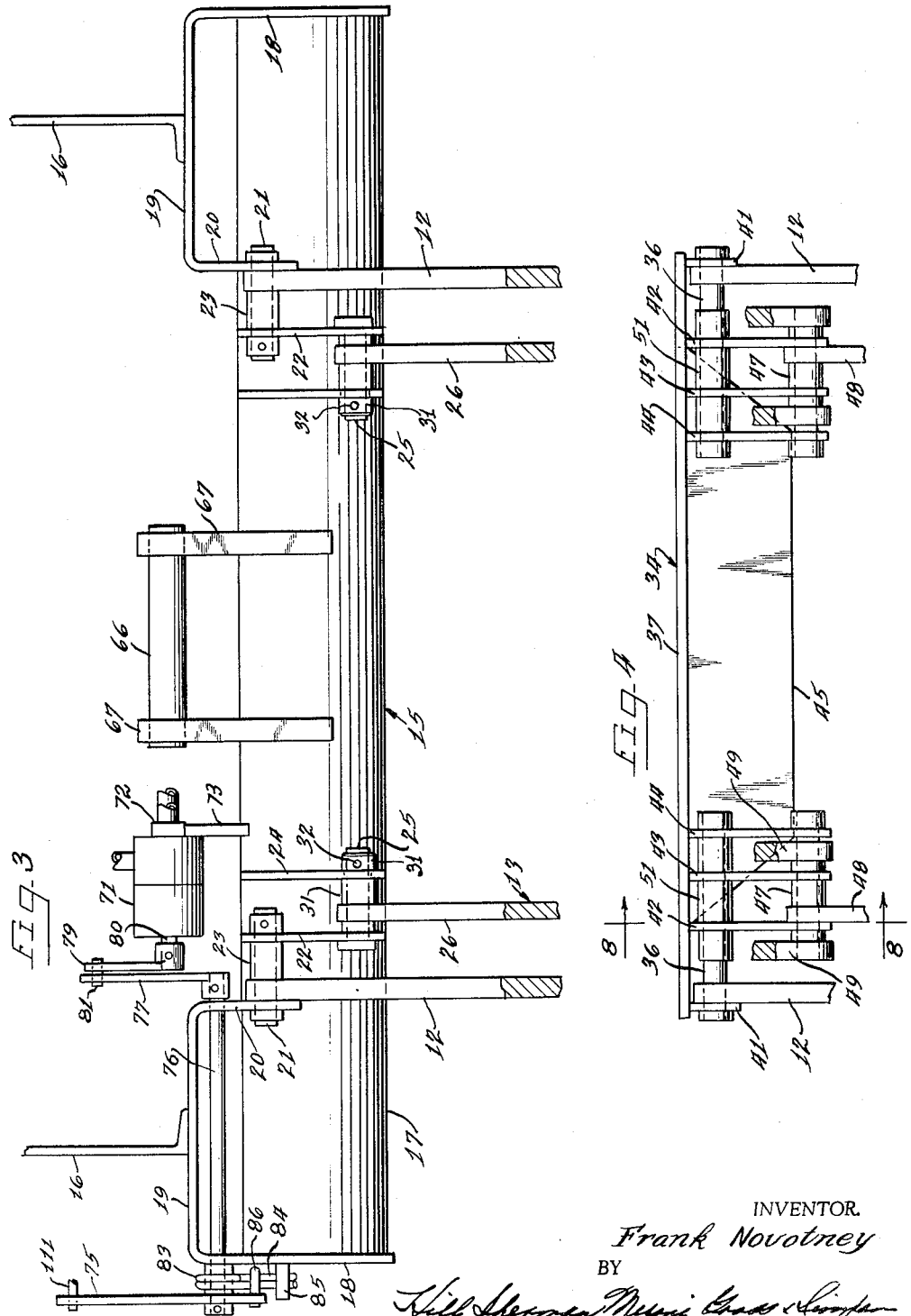
INVENTOR.
Frank Novotney
BY
ATTORNEYS

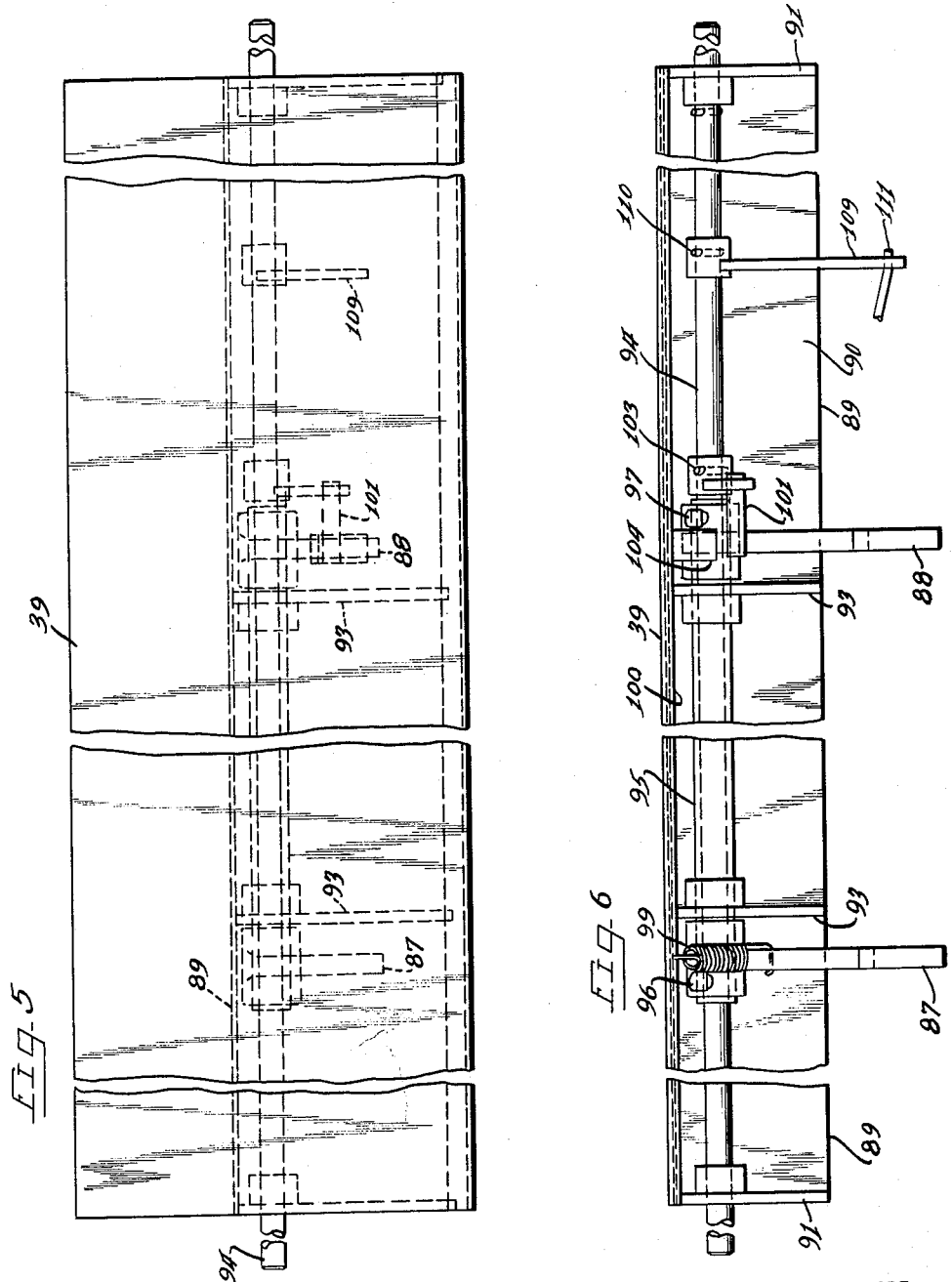

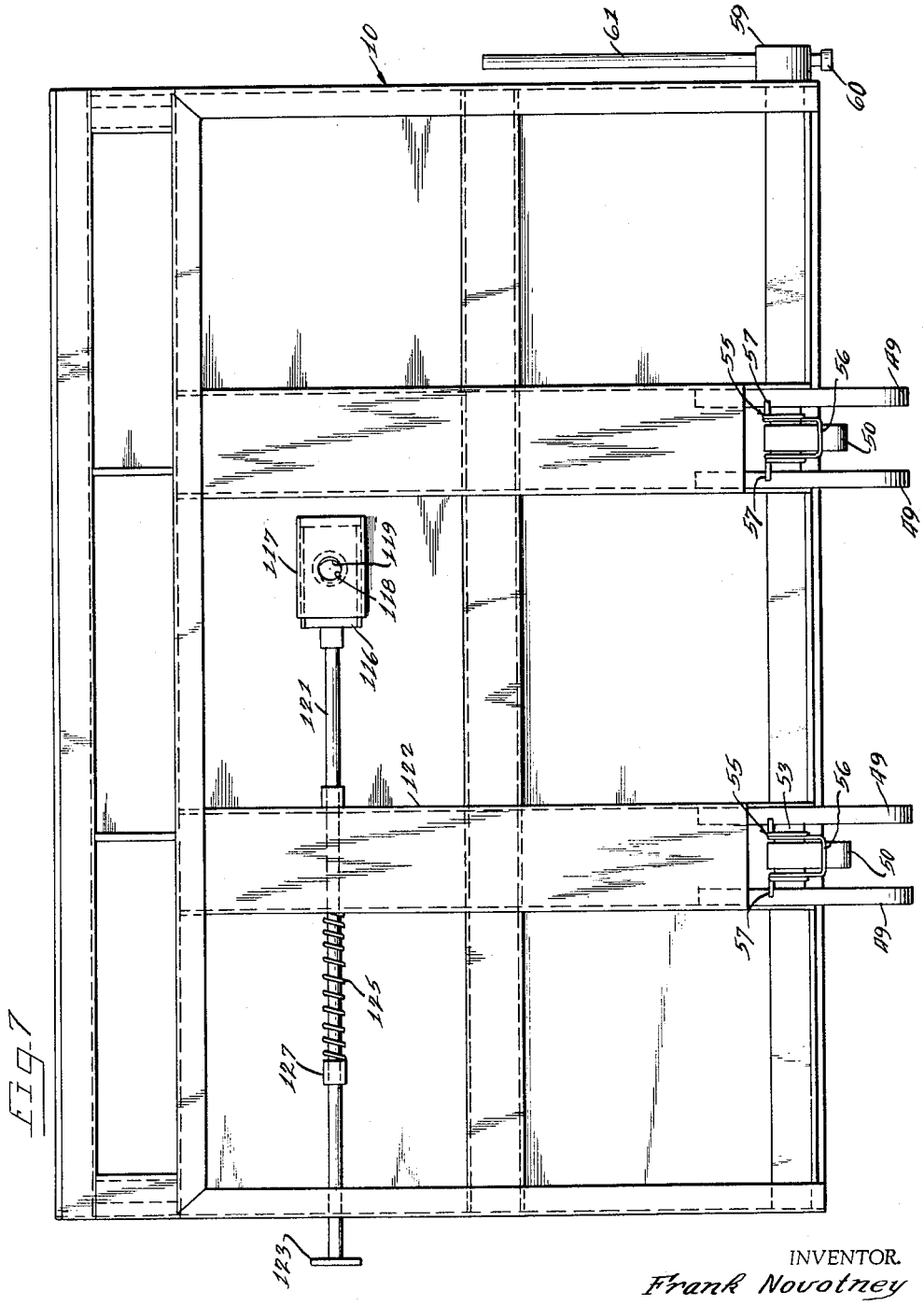

3,172,549
TUCK-AWAY TAIL GATE
Frank A. Novotney, Tonica, Ill., assignor to
Anthony Company, a corporation
Filed Aug. 23, 1962, Ser. No. 218,958
8 Claims. (Cl. 214—77)

This invention relates to improvements in a tail gate platform assembly adapted for mounting on truck and trailer bodies and more particularly relates to an improved form of tail gate platform which may be folded or tucked out of the way when not in use.

A principal object of the present invention is to provide a simple and improved form of tail gate platform assembly for loading and unloading vehicles, arranged to accommodate a tail gate platform to be stored in a tucked-away position underneath the rear end of the vehicle body when not in use.

A further object of the invention is to provide an efficient and compact form of tail gate platform, permitting the doors at the rear end of the truck body to be opened to load directly onto a loading dock without opening up the tail gate platform.

Still another object of the invention is to provide a novel and improved form of tail gate assembly for vehicles, so arranged that the tail gate platform may readily swing from a horizontal position to a stored position tucked-under the floor of the vehicle, by releasing the latches holding the tail gate platform in a horizontal position.

Still another object of the invention is to provide a tail gate assembly for loading and unloading vehicles, which may be raised from the ground level to the floor of the vehicle body, in which the elevating mechanism comprises a pair of parallel links, and in which the platform is transversely pivoted to the parallel links and held in extended relation with respect thereto to vertically move in a plurality of parallel planes, by releasable latch means, releasing the tail gate platform to fold under the vehicle body by a simple releasing operation.

These and other objects of the invention will appear from time to time as the following specification proceeds and with reference to the accompanying drawings wherein:

FIGURE 1 is a fragmentary view in side elevation of a tail gate assembly constructed in accordance with the invention, showing the tail gate platform in an elevated loading position in solid lines and showing the platform in a lowered position and in a tucked-away position in broken lines;

FIGURE 2 is a detail view illustrating certain details of the adjusting means for the elevating mechanism for the tail gate platform;

FIGURE 3 is a fragmentary transverse sectional view taken substantially along line III—III of FIGURE 1 and showing the mounting for the elevating mechanism for the tail gate platform, with the elevating cylinder removed;

FIGURE 4 is a fragmentary transverse sectional view taken through the connection of the tail gate platform to the elevating mechanism and looking towards the vehicle body on which the tail gate platform is mounted;

FIGURE 5 is a plan view of the floor extension of the vehicle body showing the safety latch mechanism for holding the tail gate platform in a horizontal extended loading position;

FIGURE 6 is an end view of the vehicle floor extension looking at the extension in a direction toward the rear end of the vehicle body;

FIGURE 7 is a bottom plan view of the tail gate platform; and

FIGURE 8 is a fragmentary sectional view taken on the plane of line 8—8 in FIGURE 4, viewed in the direction indicated, and illustrating the relationship of parts with a latch in engagement with a locking pin for holding the tail gate platform in the horizontally extended loading position as shown in FIG. 1.

In the embodiment of the invention illustrated in the drawings, I have shown in FIGURE 1 a tail gate platform 10 in an elevated position on a level with a floor 11 of a vehicle body, which may be a truck body. The tail gate platform is raised and lowered and supported in elevated and lowered positions by outer parallel arm members 12, 12 and an inner lift frame 13. The lift frame 13, with the arm members 12, 12, form in effect a parallel linkage arrangement for raising and lowering the tail gate platform 10 in a plurality of parallel planes.

The outer arm members 12, 12 are transversely pivoted at their rear ends on a transverse support frame structure 15 extending across the rear end rotion of the truck frame and shown as being suspended from parallel spaced channels 16, 16 of the truck frame. The transverse frame structure 15 is shown as being in the form of a tube 17 having plates 18 welded or otherwise secured to opposite ends thereof and extending upwardly therefrom. The plates 18 have inturned generally horizontal platform portions 19 spaced above the tube 17 and extending inwardly therealong. The platform portions 19 have depending bracket legs 20 welded or otherwise secured to the tube 17. Each bracket leg 20 forms a mounting for the outer end of a pivot pin 21 forming a pivotal mounting for an arm member 12. The pivot pins 21 are mounted at their opposite ends on bracket members 22, spaced inwardly of and parallel to the bracket legs 20. A spacer 23 spaces the arm members 12 along the pivot pins 21 into engagement with the insides of the bracket legs 20.

Bracket members 24 similar to the bracket members 22 and extending parallel thereto extending forwardly of the tube 17, and with the bracket members 22 form mountings for transverse pivot pins 25. The pivot pins 25 form pivotal mountings for spaced legs 26 of the lift frame 13.

The pivot pins 25 are shown in FIGURE 2 as being eccentric pins. Each pin has a head 27 and a cylindrical bearing support 29 spaced inwardly of said head and extending through and rotatably mounted in the bracket member 22. The pin 25 also has a pivotal support portion 30 extending from the bearing portion 29 eccentric of the center thereof. The outer end of each pin 25 is mounted in an eccentric bushing 31, rotatably mounted in the leg 24, for rotation about an axis concentric with a bearing portion 29 of the pin 25. A locking pin 32 is provided to lock the eccentric bushing 31 to the pin 25 and to lock said pin to the bracket members 22 and 24. The pins 25 may thus be turned and retained in position in a suitable manner to adjust the pivot points of the associated legs 26 with respect to the pivot points of the arm member 12. The adjustment of the pivot points for the legs 26 by the eccentric pins 25 enables the angle of the platform 10 to be adjusted, to be level when in a raised position and to be at an angle with respect to the ground when in a lowered position, where desired or necessary to facilitate loading.

The arm members 12, 12 have upwardly turned outer end portions 33 extending upwardly within a hinge member 34 when the tail gate platform 10 is in the elevated horizontal position shown by solid lines in FIGURE 1, and are pivotally connected to said hinge member on pivot pins 36, 36.

The hinge member 34 is shown in FIGURES 1 and 4 as being in the form of an angle iron having a horizontal leg 37 movable into position beneath a plate 39 of a floor extension 40 of the truck floor 11, and adapted to be recessed within said floor extension when the tail gate platform 10 is in the elevated position shown by solid lines in FIGURE 1, and in the tucked away position shown by broken lines in this figure.

The mountings for the pivot pins 36 comprise outer ears 41 depending from the bottom of the horizontal leg 37 adjacent opposite ends thereof and a series of parallel spaced inner support brackets 42, 43 and 44 depending from the underside of said horizontal leg and extending rearwardly of the vertical leg 45 of the hinge member 34.

The bracket members 42, 43 and 44 depending from each end of the hinge member 34 form mountings for hinge pins 47 pivotally connecting outer arms 48 of the lift frame 13 to said hinge member in downwardly spaced relation with respect to the points of pivotal connection of the arm members 12 to said hinge member. As shown in FIGURE 4 the arm members 48, 48 extend between the bracket members 42 and 43 on each side of the hinge member 34. Parallel spaced connector ears 49, 49 extend angularly downwardly of the forward end portion of tail gate platform 10 and are mounted on the pivot pins 47 between the brackets 43 and 44 and outside of the brackets 42.

The tail gate platform 10 is rigidly connected to the hinge member 34, to be vertically moved therewith in horizontally extended relation with respect thereto upon vertical movement of said hinge member, by means of a pair of spaced latches 50 engageable with locking pins 51, carried by the hinge member 34 between the bracket members 42 and 43 and spaced forwardly of the hinge pins 36. The latches 50, 50 are shown in FIGURE 7 as being mounted between the connecting ears 49 on a common shaft 53. A torsion spring 55 is provided for each latch 50 to bias said latch into a latching position. As shown in FIGURE 7 the torsion spring is coiled about the shaft 53 on opposite sides of the latch 50 and has a generally U-shaped portion 56 extending under the associated latch 50, to bias said latch into an upwardly extended latching position. The coiled portions of the torsion spring 55 have axially extending terminal portions 57 registering with the connector ears 49.

A collar 59 is mounted on one outer end of the shaft 53 and is secured thereto as by set screw 60. A hand lever 61 extends from the collar 59 to release the latches 50 from the locking pins 51 and to thereby allow the tail gate platform to pivot about the pivot pins 47 and to be tucked under the truck body into the tucked-away position shown by broken lines in FIGURE 1.

A hydraulic jack in the form of a cylinder 63 having a piston rod 64 extensible therefrom is connected between the frame structure 15 and the lift frame 13, to vertically move said lift frame and to thereby move the hinge member 34 and tail gate platform 10 vertically in a plurality of parallel planes, when the latches 50 are engaged with the locking pins 51, to hold the tail gate platform 10 in outwardly extended relation with respect to the hinge member 34.

As shown in FIGURE 1, the cylinder 63 has a connecting ear 65 extending from the head end thereof and pivotally mounted upon a pivot pin 66, mounted at its ends in connector brackets 67 extending angularly upwardly from the tube 17 of the frame structure 15. The piston rod 64 has a connector 69 extending from its outer end, and pivotally connected to the lift frame 13 on a transverse pivot pin 70. The cylinder 63 may be a double acting cylinder and has the usual piston (not shown) therein connected to the inner end of the piston rod 64. Fluid under pressure is supplied to the piston rod end of the cylinder 63 to retract the piston rod 64 and raise the lift frame 13 and arms 12 and is supplied to the head end of said cylinder to lower said lift frame and arm members and the tail gate platform 10. A valve 71 controls the supply of fluid under pressure to the head and piston rod ends of the cylinder 63, and the raising and lowering of the tail gate platform 10. The valve 71 is herein shown as being a rotary valve and is mounted on the tube 17 intermediate the bracket leg 20 and the connecting ear 72, on a mounting bracket 73, extending upwardly of the tube 17 (FIGURE 3).

A lever 75 on the outside of the plate 18, shown in FIGURE 1 as being the right hand plate when looking toward the rear of the machine is provided to operate the valve 71. The lever 75 is mounted on the shaft 76 rotatably mounted in the plate 18 and bracket leg 20 and extending inwardly therefrom. The operative connection from the shaft 76 to the valve 71 includes a crank arm 77 mounted on the inner end of shaft 76 and extending upwardly therefrom and a crank arm 79 mounted on a control shaft 80 for the valve 71 and extending upwardly therefrom. A pin and slot connection 81 is provided to pivotally drive the crank arm 79 from the crank arm 77.

The lever 75 is biased to the upright position shown in FIGURES 1 and 3 by a torsion spring 83 encircling the shaft 76 and having opposed depending legs 84 engaging the inner sides of stop pins 85 extending outwardly of the plate 18. Spaced pins 86 extend inwardly of the lever 75 into engagement with the legs 84 to accommodate the spring 83 to bias the lever 75 in the upright position shown in FIGURE 1 and to thereby bias the valve 71 in position to hold fluid under pressure in the cylinder 63 when pressure is released from the lever 75.

The floor extension 40 for the floor 11 of the vehicle body forms a support for safety latches 87 and 88, for holding the tail gate platform 10 in the elevated position shown in FIGURE 1. As shown in FIGURES 1, 5 and 6, a plate 89 depends from the plate 39 intermediate the ends thereof and has side plates 91 extending rearwardly therefrom along opposite sides of the floor extension 40. The side plates 91 form bearing supports for a rock shaft 94 coaxial with the pivotal axes of the safety latches 87 and 88. A sleeve 95 extends about the intermediate portion of the shaft 94 and is rotatably mounted in bracket plates 93, 93 spaced inwardly of the side plates 91, 91 and extending parallel thereto. The sleeve 95 is freely movable with respect to the shaft 94 and extends outwardly beyond the bracket plates 93, 93 and forms a mounting for the safety latches 87 and 88. Set screws 96 and 97 secure the respective safety latches 87 and 88 to the sleeve 95.

The safety latches 87 and 88 are biased into their latching positions by a tension spring 99 hooked to the safety latch 87 at one end and to a depending bead 100, extending along the rear end portion of the plate 39, at its opposite end.

The latches 87 and 88 are released by a release dog 101, secured to shaft 94 as by a pin 103, and extending over the rear end portion of the latch 88. A hand lever 105 on the outer end of the shaft 94 is provided to rock said shaft and to move the safety latches 87 and 88 to their release positions. A stop 104 depends from the rear end portion of the plate 39 to be engaged by the safety latch 88 and limit upward movement of the safety latches 87 and 88.

The safety latch 87 is engageable with a locking pin 106 extending outwardly from the arm member 12, shown in FIGURE 1 as being the right hand arm member when looking toward the rear of the truck. The safety latch 88 is engageable with a similar locking pin (not shown) projecting outwardly from the opposite arm member 12.

During lifting movement of the tail gate platform 10, the pin 106 engages a downwardly facing inclined camming surface 107 of the safety latch 87 and cams said safety latch past the pin 106, to accommodate the safety latch to be held in position to engage the pin 106 in case the tail gate platform 10 should tend to drop. The opposite safety latch 88 is cammed into a latching position in a similar manner.

A valve operating lever 109 is mounted on the shaft 94 for movement therewith, to effect operation of the valve 71 upon operation of the hand lever 105. The valve operating lever 109 is secured to the shaft 94 as by a pin 110, and is connected with the hand lever 75 as by a link in the form of a rod 111 having opposite hooked ends hooked at one end to lever 109 and at its opposite end to the lever 75, to effect operation of the lever 75 upon operation of the valve operating lever 109, operated by the hand lever 105. It is, of course, understood that as the pin 106 cams the safety catch 87 as the tail gate is being moved to the elevated position shown in FIGURE 1, the valve operating lever 109 remains stationary with the hand lever 105, since the safety latch 88 moves away from the release dog 101.

A means is provided to latch the tail gate platform 10 in its tucked-away position, which is shown in FIGURES 1 and 7 as being in the form of a keeper 112 in the general form of a bolt secured to the lift frame 13 and projecting outwardly therefrom perpendicular to said lift frame (FIGURE 1). The keeper 112 has a conical head 113 terminating at its inner end in a shoulder 115 adapted to be engaged by a latch plate 116. The latch plate 116 is slidably mounted in a guide 117 mounted on the bottom of the tail gate platform 10 and depending therefrom. The guide 117 has a central apertured portion 118, generally registering with a central apertured portion 119 in the latch plate 116. A rod 121 is secured to the latch plate 116 and extends outwardly therefrom to one side of the tail gate platform 10 and extends across and is guided in a reinforcing beam 122, extending along the bottom of the tail gate platform 10. The rod 121 extends transversely of the tail gate platform 10 outwardly beyond an outer side thereof and has a hand grip 123 on its outer end. A compression spring 125 encircles the rod 121 on the opposite side of beam 122 from the latch plate 116 and abuts the beam 122 at one end and a collar 127, secured to the rod 122, at its opposite end and biases the apertured portion 119 in the latch plate 116 out of direct registry with the apertured portion 118 of the guide member 117.

Thus as the tail gate platform is moved to its tucked-away position beneath the truck body, the conical head 113 of the keeper member 112 will cam the latch plate 116 against the compression spring 125 and accommodate said spring to move the apertured portion 119 of the latch plate 116 into engagement with the shoulder 115 of the keeper member 112, to lock the tail gate platform in its tucked-away position.

During normal operation of the tail gate platform to lift the load to the level of the floor 11, the latches 50 are in engagement with the latch pins 51, to retain the tail gate platform in rigid relation with respect to the hinge member 34 to be raised and lowered in a plurality of parallel horizontal planes, by raising and lowering of the lift frame 13 and arm members 12. Raising and lowering of the tail gate platform may be controlled either by the hand lever 105 or the hand lever 75, the hand lever 105 usually being used for this purpose. As, however, it is desired to load directly from a dock, the latches 50 are released by operation of the hand lever 61. When the tail gate platform 10 is in its elevated position shown in FIGURE 1, and the latches 50 are released, the platform 10 may drop to a vertical position and then be moved inwardly by the hand until the keeper is latched into engagement with the latch plate 116. The truck may then be backed up to the dock and the tail gate platform may remain in its tucked away position both during the loading operation and during travel of the truck from place to place, until manually released by operation of the rod 121, to depress the latch plate within the guide 117 and release said latch plate from the shoulder 115 of the keeper 112.

It should, of course, be understood that if desired the latches 50 may be released when the tail gate platform is in a lowermost position in engagement with the ground as by broken lines in FIGURE 1. When so released, the lift frame 13 and arm members 12 are elevated to recess the hinge member 34 under the plate 39 of the floor extension 40, the tail gate platform 10 pivoting downwardly as the hinge member 34 is lifted by the lift frame 13 and arm members 12. To again use the gate platform it is merely necessary to release the latch plate 116 from the keeper 112 and pivot the tail gate platform upwardly by hand to its horizontally extending position.

While I have herein shown and described one form of which my invention may be embodied, it may readily be understood that various variations and modifications in the invention may be attained without departing from the spirit and scope of the novel concepts thereof as defined by the claims appended hereto.

I claim as my invention:

1. A tail gate assembly comprising a tail gate platform,
elevating means for raising and lowering said platform in a plurality of parallel planes,
pivot means pivotally connecting said platform to said elevating means to accommodate pivotal movement of said platform with respect to said elevating means in a downward direction,
releasable means for connecting said platform in extended relation with respect to said elevating means, and
releasable to accommodate said platform to pivot downwardly about said pivot means when said elevating means is in an elevated position, and an interengaging releasable latching means positioned on both said platform and said elevating means for retaining said platform in downwardly pivoted relation with respect to said elevating means and substantially parallel to the main plane of said elevating means.

2. A tail gate assembly comprising,
a tail gate platform,
elevating means for raising and lowering said platform,
pivot means for connecting said platform to said elevating means to accommodate pivotal movement of said platform with respect to said elevating means in a downward direction,
a latch connected between said platform and said elevating means and retaining said platform in extended relation with respect to said elevating means to be elevated thereby in a plurality of parallel planes,
a hand lever for releasing said latch to accommodate said platform to pivot downwardly along said elevating means,
and an interengaging releasable latching means positioned on both said platform and said elevating means for retaining said platform in downwardly extended relation with respect to said elevating means and tucked away adjacent the main plane of said elevating means.

3. A tail gate assembly for trucks and the like comprising a tail gate platform,
elevating means for raising and lowering said platform including a hinge member, pivot means pivotally connecting said platform to said hinge member,
latch means rigidly connecting said platform to said hinge member to effect vertical movement of said platform with said hinge member into a plurality of parallel horizontal planes,
manually operable means for releasing said latch means to accommodate said platform to pivot downwardly,
and an interengaging releasable latching means positioned on both said platform and said elevating means for retaining said platform in downwardly pivoted relation with respect to said elevating means and substantially parallel to the main plane of said elevating means.

4. A tail gate assembly for trucks and the like comprising,
a tail gate platform,
elevating means for raising and lowering said platform,
a hinge member carried by said elevating means, means pivotally connecting said platform to said hinge member,
a releasable latch connecting said platform with said hinge member to extend horizontally therefrom and move vertically therewith in a plurality of parallel planes,
a manually operable release member for said latch, releasing said latch to accommodate said platform to pivot downwardly along said elevating means, and an interengaging releasable latching connection between said platform and said elevating means having a first portion thereof spaced outwardly along said platform and a second portion thereof positioned on said elevating means,
for latching said platform to said elevating means to maintain said platform in a tucked away position along said elevating means.

5. In a tail gate assembly,
a support adapted for mounting on a vehicle body,
two pairs of spaced arms pivoted on said support,
power means for moving said arms about a pair of spaced parallel axes,
a hinge member connected to the free ends of said arms and moved thereby into a plurality of parallel horizontal planes,
a tail gate platform,
means pivotally connecting said platform to said hinge member,
a latch connecting said platform to said hinge member to extend horizontally therefrom,
said latch being releasable to accommodate said platform to pivot downwardly, and an interengaging releasable latching means positioned on both said platform and said elevating means for retaining said platform in a downwardly pivoted relation tucked beneath the vehicle body along said arms.

6. In a tail gate assembly,
a support adapted to mounting on a vehicle body, two pairs of spaced arms transversely pivoted to said support,
a hinge member pivoted to the outer ends of said arms at vertically spaced points,
power means for moving said arms about a pair of parallel spaced axes and moving said hinge member vertically in a plurality of parallel planes,
a tail gate platform,
means pivotally connecting said platform to said hinge member to pivot above a horizontal axis extending transversely of said hinge member,
a latch for rigidly connecting said platform to said hinge member to move vertically therewith in a plurality of parallel horizontal planes,
a manually operable release lever for said latch, for releasing said latch to pivot downwardly along said arms, and an interengaging releasable latching means positioned on both said platform and said elevating means for retaining said platform in a downwardly pivoted relation tucked away along said arms.

7. In a tail gate assembly and in combination with a vehicle including a vehicle body having a floor,
an extension for said floor having a bottom opening recess,
a support mounted on the vehicle body,
two pairs of spaced arms transversely pivoted to said support,
a hinge member transversely pivoted to the free ends of said arms at vertically spaced points,
power means for moving said arms about a pair of parallel spaced axes and moving said hinge member vertically into a plurality of parallel planes,
a tail gate platform,
means pivotally connecting said platform to said hinge member for pivotal movement with respect thereto about an axis extending transversely of said hinge member,
a latch rigidly connecting said platform in extended relation with respect to said hinge member for movement therewith into the plurality of parallel planes,
a manually operable release lever for said latch accommodating said platform to pivot downwardly with respect to said hinge member,
and an interengaging releasable latching means positioned on both said platform and said elevating means for retaining said platform in downwardly pivoted relation tucked away along said arms,
said recess in said extension receiving said hinge member and protecting said hinge member during loading when said platform is extended horizontally with respect to said hinge member and tucked away along said arms, 8. In a tail gate assembly and in combination with a vehicle including a vehicle body having a floor,
an extension for said floor having a bottom opening recess,
a support mounted on the vehicle body,
two pairs of spaced arms transversely pivoted to said support,
a hinge member transversely pivoted to the free ends of said arms at vertically spaced points,
power means for moving said arms about a pair of parallel spaced axes and moving said hinge member vertically into a plurality of parallel planes,
a tail gate platform,
means pivotally connecting said platform to said hinge member for pivotal movement with respect thereto about an axis extending transversely of said hinge member,
a latch rigidly connecting said platform in extended relation with respect to said hinge member for movement therewith into the plurality of parallel planes,
a manually operable release lever for said latch accommodating said platform to pivot downwardly with respect to said hinge member,
said recess in said extension receiving said hinge member and protecting said hinge member during loading,
a safety latch on said floor extension engageable with said hinge member for retaining said hinge member from lowering movement with respect to said floor extension,
a hand lever operable to release said safety latch and to effect raising and lowering movement of said arms,
and an interengaging releasable latching means positioned on both said platform and said elevating means for retaining said platform in downwardly pivoted relation tucked away along said arms.

References Cited in the file of this patent
UNITED STATES PATENTS

| | | |
|---|---|---|
| 2,850,187 | Roberts | Sept. 2, 1958 |
| 2,989,196 | Lugash | June 20, 1961 |
| 3,065,869 | Mathers et al. | Nov. 27, 1962 |